March 9, 1926.
J. R. KING
WINDSHIELD CONTROL
Filed Sept. 17, 1923
1,576,481
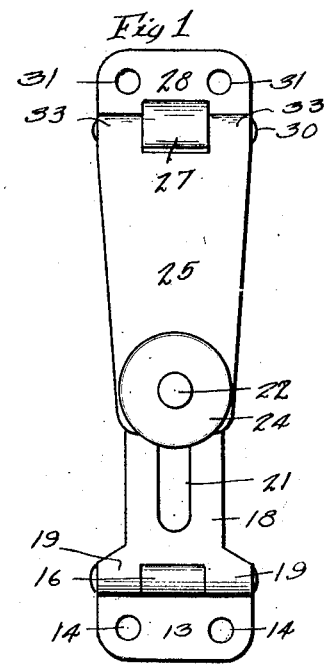
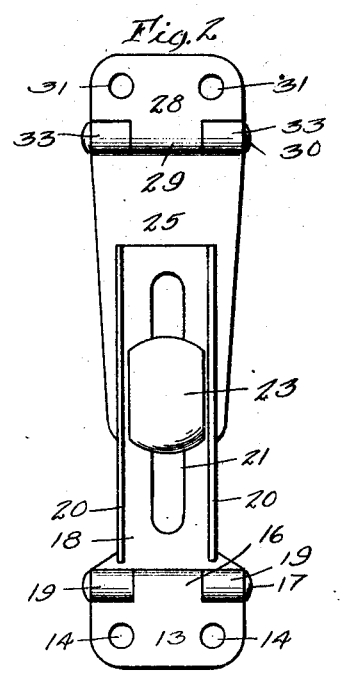
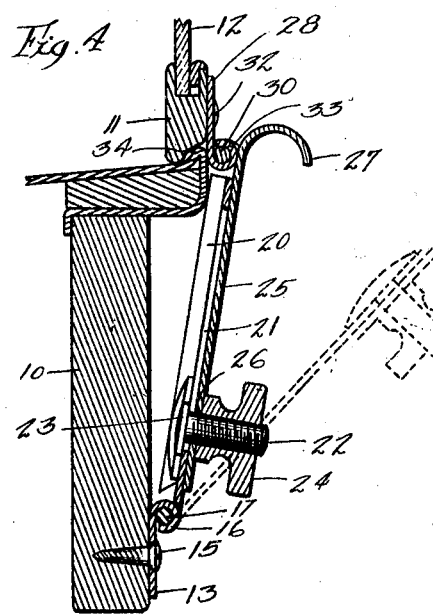
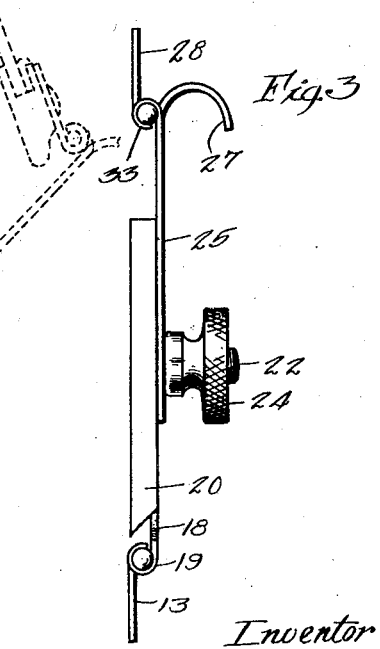
Witness
Lynn Latta
Inventor
John R. King
By Bair & Freeman Attys Patented Mar. 9, 1926.

1,576,481

UNITED STATES PATENT OFFICE.

JOHN R. KING, OF RUTHVEN, IOWA.

WINDSHIELD CONTROL.

Application filed September 17, 1923. Serial No. 663,105.

*To all whom it may concern:*

Be it known that I, JOHN R. KING, a citizen of the United States, and a resident of Ruthven, in the county of Palo Alto and State of Iowa, have invented a certain new and useful Windshield Control, of which the following is a specification.

The object of my invention is to provide a control connection between the windshield of an automobile and the dash thereof, whereby the windshield may be opened and locked in any desired position.

Still a further object is to provide a device conveniently located on the dash of the automobile wherein the operator of the car may control the windshield with one hand and lock it in any of its positions.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front view of my improved wind shield control device.

Figure 2 is a rear view of the same.

Figure 3 is an end view; and

Figure 4 is a sectional view taken through the dash of an automobile and a portion of a wind shield showing my control device installed therein, one position being shown in dotted lines.

In the accompanying drawings, I have used the reference numeral 10 to indicate generally the dash of an automobile and 11 the wind shield frame.

A glass plate 12 is mounted in the wind shield frame.

The wind shield frame is of the ordinary construction and is capable of pivotal or swinging movement in the ordinary manner.

The parts for permitting the swinging movement of the wind shield frame are not shown in the drawing.

This invention is similar in subject matter to my co-pending application, filed September 17, 1923, Serial Number 663,104.

My control device consists of a plate 13, which is formed with a pair of openings 14 for permitting screws to be extended therethrough for properly anchoring the plate 13 to the dash 10.

The upper end of the plate 13 is formed with an ear 16, which is rolled over so as to receive a pintle rod 17. A swinging plate 18 is provided with a pair of rolled ears 19 for straddling the rolled ear 16 on the plate 13 and for receiving the pintle rod 17.

The parts just described form a hinge connection between the swinging plate 18 and the plate 13.

The plate 18 is formed with a pair of inturned side flanges 20, so that the plate 18 when cut horizontally will be channel-shaped in cross section.

The purpose of providing the in-turned flanges 20 will hereinafter be more fully set forth.

The plate 18 is provided with an elongated slot 21. A bolt 22 extends through the elongated slot 21 and is formed with an enlarged head 23 resting against the inner surface of the swinging plate 18. The head 23 is provided with a pair of flattened sides, so that it is received between the in-turned flanges 20 for preventing any possible rotation of the bolt 22.

A knurled thumb nut 24 is mounted on the bolt 22.

A control bar 25 is formed with an opening 26 through which is extended the bolt 22. The nut 24 rests against the control bar 25.

From the construction of the parts just described, it will be seen that the swinging plate 18 and the control bar 25 are connected together by a sliding connection.

The upper end of the control bar 25 is curved in cross section, so as to form a finger engaging piece 27.

Secured to the wind shield frame 11 is a connector member 28, which is formed with a rolled ear 29 on its lower edge for receiving a pintle rod 30. The connector member 28 is formed with a pair of openings 31 for permitting the screws 32 to extend therethrough for anchoring the same to the frame 11.

The upper end of the control bar 25 is formed with a pair of rolled spaced ears 33, which straddle the ear 29 on the connector member 28 for permitting the pintle rod 30 to be extended therethrough.

The parts just described form a hinge connection between the control bar 25 and the connector member 28.

In order to swing the wind shield frame inwardly, it is necessary to first raise the wind shield upwardly, so that it clears the projection 34 on the body of the automobile.

The projection 34 is designed to prevent rain from driving into the automobile below the wind shield.

In order to operate the wind shield, it is first necessary to release the thumb nut 24, which will permit the control bar 25 to be raised upwardly a short distance and then permit it to be drawn inwardly to the position shown in dotted lines in Figure 4.

The sliding connection between the swinging plate 18 and the control bar 25 permits the wind shield frame to be raised upwardly a short distance and then the hinge connections as well as the sliding connection permits the wind shield to be moved inwardly as shown by the dotted lines in Figure 4.

While I have shown the elongated slot 21 in the plate 18, it will be understood that the elongated slot may be placed within the control bar 25 and the parts will work with equal efficiency and in substantially the same manner.

One of the advantages of my device resides in the fact that it can be so positioned on the dash that it will be in convenient reach of the driver of the car, and he can operate the same for either opening or closing the wind shield with a minimum amount of inconvenience.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. A wind shield control device comprising a plate secured to the dash of an automobile, a swinging plate hingedly connected thereto, a control bar slidably mounted on said swinging plate, means for hingedly connecting the control bar to the wind shield frame, a pair of in-turned flanges on said swinging plate, said swinging plate having a slot therein, a bolt extended through said slot and having its head held between said flanges, said bolt serving to lock said swinging plate and control bar together as specified.

2. A wind shield control device comprising a plate secured to the dash of an automobile, a swinging plate hingedly connected thereto, a control bar slidably mounted on said swinging plate, a connector member secured to the wind shield frame, means for hingedly connecting the control bar to said connector member, a finger piece at said last mentioned hinge and means for clamping said swinging plate and said control bar together when the windshield is in any of its adjusted positions.

JOHN R. KING.